(12) United States Patent
Tsuchiya

(10) Patent No.: US 8,062,112 B2
(45) Date of Patent: Nov. 22, 2011

(54) GAME INFORMATION PROCESSING APPARATUS AND GAME CONTROL PROGRAM

(75) Inventor: Koji Tsuchiya, Tokyo (JP)

(73) Assignee: Sega Corporation, Tokyo (JP)

( * ) Notice: Subject to any disclaimer, the term of this patent is extended or adjusted under 35 U.S.C. 154(b) by 1356 days.

(21) Appl. No.: 11/089,761

(22) Filed: Mar. 24, 2005

(65) Prior Publication Data

US 2005/0221879 A1     Oct. 6, 2005

(30) Foreign Application Priority Data

Mar. 31, 2004 (JP) ................................. 2004-104928
Jan. 25, 2005 (JP) ................................. 2005-016361

(51) Int. Cl.
*A63F 9/24* (2006.01)

(52) U.S. Cl. ......... 463/8; 463/1; 463/9; 463/40; 463/41; 463/42

(58) Field of Classification Search .................. 463/1–9, 463/23, 40–42
See application file for complete search history.

(56) References Cited

U.S. PATENT DOCUMENTS 6,913,536 B2 * 7/2005 Tomizawa et al. .............. 463/43
7,635,300 B2 * 12/2009 Kojima et al. .................... 463/1

FOREIGN PATENT DOCUMENTS

| JP | 2000-107454 | 4/2000 |
|----|-------------|--------|
| JP | 2001-187267 | 7/2001 |
| JP | 2002-57818  | 2/2002 |
| JP | 2002-224440 | 8/2002 |
| JP | 2004-057818 | 2/2004 |

OTHER PUBLICATIONS

Complete Strategy Guide Series of Playstation 116 Simple 1500 Series vol. 11-12, The Guide Book, Futaba Inc., Oct. 15, 2000, First Edition, p. 20, p. 23, ISBN4-575-16226-4.
Over The Monochromerainbow featuring Shogo Hamada Perfect Navigator, Degicube Inc., Mar. 19, 2003, First Edition, p. 111, ISBN4-88787-116-3.
Tekken(Fist)-Tag-Tournament The-Masters, Namuco Inc., Aug. 13, 1999, First Edition, p. 005, ISBN4-7973-1039-1.

* cited by examiner

*Primary Examiner* — Pierre E Elisca
(74) *Attorney, Agent, or Firm* — Jodan and Hamburg LLP

(57) ABSTRACT

In processing new damage, when a character passes a first devastating flame and drops into a next devastating flame, damage of the latter devastating flame is deemed first damage, and the "game continuity ability value" is exempted from decrement. If the character drops into a further devastating flame, such drop is not new damage, and the "game continuity ability value" is decreased by a predetermined decrement value.
In processing recurrent damage, when the character passes a first devastating flame, drops into a second devastating flame and drops again into a third devastating flame, the first failure occurs at the second devastating flame, and the "game continuity ability value" is decreased by a predetermined value, and is exempted from decrement at the third devastating flame because the drop is a recurrent failure.

13 Claims, 9 Drawing Sheets

Fig. 9

| Kind of Game | Game Specification | Judgment of Game Result | Judgment Manner of Game-Over | Condition of Easy Game-Over |
|---|---|---|---|---|
| Shooting Game/ Action Game | Player operates and moves main chracter having a weapon in area such as topography called map. The main character escapes from attack of enemy character controlled by CPU as well as attack the enemy character as counteraction. Life Value or Number of Retry Times is set for main character. When attacked by enemy character, it occurs that life Value decreases or that game is interrupted, restrats from the attack point and Number of Retry Times is decreased by "1". Game is cleared when main character beats all the enemies befor the Value loses. Life Value and Number of Retry Times decreases on collision with topography. | Is Life Value or Number of Retry Times is Decreased According to Collision Jusgment of the Movement with Enemy's Attack or Ground, When Main Character Moves According to Operation of Player. | It is Judged Whether Life Value and/or Number of Retry Times Becomes Zero or not. | NO Escape Operation from an Attack of Enemy Character, or a Surprise Attack not Shown in the Display Image |
| Fiting Game | Genarally, game simulating a figting one character agaist one. Opponent is charcter controlled by computer or by another player. Life Value is set for each character. If character prevents attack of opponent, Life Value is not decreased. If it is not prevented, Life Value is decreased. Character which loses Life Value earlier than the other is beated. Both cannot be winner within predetermined time, character of more Life Value than the other wins at the predetermined time. | Is Life Value of Character Operated is Decreased by Attack Technique Caused by Movement of Opponent Character, When Opponent Character Moves According to Operation of Opponent. | It is Judged Whether Life Value is zero or not. | Too Many kinds of Attack to Judge How to Attack |
| Adventure Game | According to player's choices among displayed choices, scenario mainly of sound or text is advanced. If players choice is correct, senario advances to the end of happy ending. By wrong choice, it come to game-over or advanced through another story of bad ending. | | It is Judged whether Erronious Selection is made concerning Game Status or not. | |
| Role-Playing Game | Game is advanced by player who operates main character. Image of main chracter is displayed which is operated and moved in area such as topography called map. Main character fight against enemy character with selecting command of offense and defense by operational input, when main character meets with enemy character set on map. Life Value or Number is set for main character and enemy character. Opponent's Life Value is decreased by attack of the main character, and player selects command for preventing Life Value from decrement by defense. Character which loses Life Value earlier than the other is beated. Character whose Life Value remains wins. | | It is Judged Whether Life Value Bacomes Zero or not. | |

GAME INFORMATION PROCESSING APPARATUS AND GAME CONTROL PROGRAM

BACKGROUND OF THE INVENTION

1. Field of the Invention

The present invention relates to a game information processing apparatus and a game control program, and particularly to control of terminating, interrupting and restarting of a game.

2. Prior Art

In computer games, the termination (game over) processing is generally executed when a positive condition is satisfied, for example, when a player clears the final stage, or when a negative condition is satisfied, for example, the player fails in operation a predetermined number of times or suffers a damage of predetermined extent by opponent players or by enemy characters. The player has a feeling of satisfaction depending greatly on the condition set.

For example, if a normal negative condition same as that for high skill players (heavy players) is applied to low skill players (light users) or very young players, the game is immediately ended. The players can not enjoy the game sufficiently, and the players' game playing may lessen.

There is a case when the player does not know how to escape from an attack due to lack of skills in fighting a game etc. In such a case, if an opponent player finds the player's weak point and concentrates in attacking the weak point, so called "HAME" (entrap case) occurs, the player encounters game-over without doing anything. Various stories and effects are meaningless, and the game becomes dull and with the only goal being victory.

In the game system of Kokai publication 2001-187267, a rule of customizing is possible such that the difficulty of the game is totally lowered.

In the game machine of Kokai publication 2004-057818, an extra game mode is added if necessary when a positive condition is set.

In the golf game program of Kokai publication 2002-224440, a player can learn the rule and manner of golf.

In the game system of the patent document 1, the interest of the game such as a feeling of achievement may incline. The game technique of game creation is limited, it is difficult to keep the interest and excitement of players, and increasing of the skill the light users is hopeless. The one side game of "HAME" etc. cannot be solved.

In the game machine of the patent document 2, there is no change in the game content. The player may have a monotonous impression. There is no improvement concerning the negative conditions.

In the golf game program of the patent document 3, until the player masters the rule and manner, the player cannot enjoy the game. There is no improvement concerning the termination conditions.

Therefore, in the conventional game information processing apparatus, the interest planned by the game creator may not sufficiently be provided to the players even when the game difficulty is modified concerning the game end control. It is difficult to encourage the players' progress of skill and the game cannot follow the skill progress.

For example, difficulty of a game is changed by changing behavior parameters of a player character or by omitting gimmicks of the game. Here, a stage is assumed that a player character has to jump over and across a river as an event of a game. There is a floating waterweeds in the middle of the river, the player character has to jump to the floating waterweeds first, and further has to jump to the opposite side. A gimmick is prepared by the game creator that the floating waterweeds sink when the staying time length on the floating waterweeds exceeds a predetermined time length.

However, the gimmick is deleted or parameters are changed regarding jumping power or quick response jumping power so that the player character easily goes across the river. In this case, the gimmick changed from what in itself gives game pleasure to what is only an variation of moving mode of the character. Therefore, the interest of the game planned by the game creator is not sufficiently provided to the players. The player never has feeling of reality of the interest planned by the game creator.

SUMMARY OF THE INVENTION

The present invention is invented to solve the conventional problems and has an object to set and control a termination conditions by which players sufficiently perceive an interest of a game.

The present invention is a game information processing apparatus which advances a game in response to player's indicative input, changes a predetermined game continuity ability value in response to an occurrence of game status under a predetermined condition according to a progress of said game, and judges whether said game is to be continued or not according to said game continuity ability value, comprising memory means for storing said occurrence of said game status, a new status judgment means for judging whether said occurrence of said game status has been already stored in said memory means or not, a game continuity ability value control means for changing said game continuity ability value by a decrement value corresponding to said game status when said new status judgment means judges said game status is new, for storing said game status in said memory means when said new status judgment means judges that said game status is not stored, and for continuing said game without changing said game continuity ability value or for changing said game continuity ability value by a value less than said decrement value, and a termination judgment means for terminating said game when said game continuity ability value reaches a predetermined termination value and for continuing said game when said game continuity ability value does not reach said predetermined termination value. Therefore, players enjoy original game interests planned by game creators regardless of players' skill, and is encouraged to improve game skill, without decreasing difficulties of the game for example by omitting the game effect.

The present invention is a game information processing apparatus which advances a game in response to player's indicative input, changes a predetermined game continuity ability value in response to an occurrence of said game status under a predetermined condition according to a progress of said game, and judges whether said game is to be continued or not according to said game continuity ability value, comprising a memory means for storing said occurrence of said game status, a status recurrence judgment means for judging whether said occurrence of said game status has been already stored in said memory means or not, a game continuity ability value control means for storing said game status in said memory means when said new status judgment means judges that said game status is not stored as well as for changing said game continuity ability value by a decrement value corresponding to said game status, and for continuing said game without changing said game continuity ability value or for changing said game continuity ability value by a value less than said decrement value, and a termination judgment means for terminating said game when said game continuity ability value reaches a predetermined termination value and for continuing said game when said game continuity ability value does not reach said predetermined termination value.

Therefore, players enjoy original game interests planned by game creators regardless of players' skill, and are encouraged to improve game skill, without decreasing difficulties of the game, for example by omitting the game effect.

The present invention is a game information processing apparatus which operates a player object according to a player's indicative input so as to attack an opponent object, which a game continuity ability value predetermined corresponding to said opponent object is changed in response to a content of said attack and in response to a status of said opponent object according to a progress of said game, and which judges whether said game is to be continued or not according to said game continuity ability value, comprising a memory means for storing a content of an attack when a player object is offense side and an opponent object is defense side, a judgment means for judging whether said content of said attack has been already stored in said memory means or not when said opponent object is not defense side while said player object is offense side, a game continuity ability value control means for changing said game continuity ability value by at least a decrement value corresponding to said content of said attack when said judgment means judges that said content is stored, and for continuing said game without changing said game continuity ability value or for changing said game continuity ability value by a value less than said decrement value, and a termination judgment means for terminating said game when said game continuity ability value reaches a predetermined termination value and for continuing said game when said game continuity ability value does not reach said predetermined termination value.

Therefore, particularly in fighting games, players enjoy original game interests planned by game creators regardless of players' skill, and are encouraged to improve game skill, without decreasing difficulties of the game, for example by omitting the game effect.

The present invention is a game program executable by a computer having a function that said game program advances a game in response to player's indicative input, that said game program changes a predetermined game continuity ability value in response to an occurrence of a game status under a predetermined condition according to a progress of said game, and that said game program judges whether said game is to be continued or not according to said game continuity ability value, characterized in comprising steps of (1) A first step for securing an area in a memory for storing an occurrence of a game status, (2) A second step for judging whether said status occurred under said predetermined condition is stored in said memory or not, (3) A third step for changing said game continuity ability value by a decrement value when it is judged that said status is stored in said second step, (4) A fourth step for storing said game status in said memory when it is judged that said game status is not stored in said second, and for continuing said game without changing said game continuity ability value or for changing said game continuity ability value by a value less than said decrement value; and (5) A fifth step for terminating said game when said game continuity ability value reaches a predetermined termination value and for continuing said game when said game continuity ability value does not reach said predetermined termination value.

Therefore, players enjoy original game interests planned by game creators regardless of players' skill, and are encouraged to improve game skill, without decreasing difficulties of the game, for example by omitting the game effect.

Said game program according to the present invention may further comprise a step for generating and outputting an image or a sound showing a way to escape said game status when said game status is not stored in said memory.

The present invention is a game program executable by a computer having a function that said game program advances a game in response to player's indicative input, that said game program changes a predetermined game continuity ability value in response to an occurrence of a game status under a predetermined condition according to a progress of said game, and that said game program judges whether said game is to be continued or not according to said game continuity ability value, characterized in comprising steps of (1) A first step for securing an area in a memory for storing an occurrence of a game status, (2) A second step for judging whether said status occurred under said predetermined condition is stored in said memory or not, (3) A third step for storing said game status in said memory when it is judged that said status is not stored in said second step and for changing said game continuity ability value by a decrement value corresponding to said game status, (4) A fourth step for continuing said game without changing said game continuity ability value or for changing said game continuity ability value by a value less than said decrement value, and (5) A fifth step for terminating said game when said game continuity ability value reaches a predetermined termination value and for continuing said game when said game continuity ability value does not reach said predetermined termination value. Therefore, players enjoy original game interests planned by game creators and are encouraged to improve game skill, without decreasing difficulties of the game, for example by omitting the game effect.

Said game program according the present invention may further comprises a step for generating and outputting an image or a sound showing a way to escape said game status when said game status is stored in said memory.

The present invention is a game program executable by a computer having a function that a player object is operated by a player's indicative input so as to attack an opponent object, and that a game continuity ability value predetermined corresponding to said opponent object is changed in response to a content of said attack and in response to a status of said opponent object according to a progress of said game, and that it is judged whether said game is to be continued or not according to said game continuity ability value, characterized in comprising steps of (1) A first step for storing said content of said attack in a memory when said player object is offense side and said opponent object is defense side, (2) A second step for judging whether said content of said attack has been already stored in said memory or not when said object of said opponent is not defense side while said object of said player is offense side, (3) A third step for changing said game continuity ability value by at least a decrement value corresponding to said content of attack when it is judged that said content is stored in said second step, (4) A fourth step for continuing said game without changing said game continuity ability value or for changing said game continuity ability value by a value less than said decrement value when it is judged that said content is stored in said second step, and (5) A fifth step for terminating said game when said game continuity ability value reaches a predetermined termination value.

Therefore, players enjoy original game interests planned by game creators particularly in fighting games and are encouraged to improve game skill, without decreasing difficulties of the game, for example by omitting the game effect.

Said game program according the present invention may further comprises a step for generating and outputting an image or a sound showing a way to escape said attack when said content of attack is not stored in said memory.

The present invention is a game program executable by a computer having a function that a player object is operated by a player's indicative input or by CPU's control so as to attack an opponent object, and that a game continuity ability value predetermined corresponding to said opponent object is changed in response to a content of said attack and in response to a status of said opponent object according to a progress of said game, and that it is judged whether said game is to be continued or not according to said game continuity ability value, characterized in comprising steps of (1) A first step for storing said content of said attack in a memory when said player object is offense side and said opponent object is defense side, (2) A second step for judging whether said content of said attack has been already stored in said memory or not when said object of said opponent is not defense side while said object of said player is offense side, (3) A third step for changing said game continuity ability value by at least a decrement value corresponding to said content of attack when it is judged that said content is stored in said second step, (4) A fourth step for continuing said game without changing said game continuity ability value or for changing said game continuity ability value by a value less than said decrement value when it is judged that said content is stored in said second step, and (5) A fifth step for terminating said game when said game continuity ability value reaches a predetermined termination value and for continuing said game when said game continuity ability value does not reach said predetermined termination value.

Therefore, players enjoy original game interests planned by game creators particularly in fighting games and is encouraged to improve game skill, without decreasing difficulties of the game, for example by omitting the game effect.

Said game program according to the present invention may further comprises a step for generating and outputting an image or a sound showing a way to escape said attack when said content of attack is not stored in said memory.

The present invention is a game program executable by a computer having a function that a player object is operated and moved on a map by a player's indicative input, that a contact condition of said player object with an obstacle object set on said map, that a predetermined game continuity ability value is changed according to said judgment of said contact condition, and that it is judged whether said game is to be continued or not according to said game continuity ability value, characterized in comprising steps of (1) A first step for securing an area in a memory for storing said judgment of said contact condition, (2) A second step for judging whether said judgment of said contact condition is stored in said memory or not when said contact condition is judged, (3) A third step for changing said game continuity ability value by a predetermined decrement value corresponding to said judgment when said contact condition is stored in said memory in said second step, (4) A fourth step for storing said judgment when it is judged that said contact condition is not stored in said memory in said second step, and for continuing said game without changing said game continuity ability value or for changing said game continuity ability value by a value less than said decrement value, and (5) A fifth step for terminating said game when said game continuity ability value reaches a predetermined termination value and for continuing said game when said game continuity ability value does not reach said predetermined termination value.

Therefore, players enjoy original game interests planned by game creators particularly in role-playing games and is encouraged to improve game skill, without decreasing difficulties of the game, for example by omitting the game effect.

Said game program according the present invention may further comprises a step for generating and outputting an image or a sound showing a way to escape said contact condition when said contact condition is not stored in said memory.

Said game program according to the present invention may further comprises a step for notifying said player by outputting an image or a sound when said game continuity ability value is not changed or is changed by a value less than said decrement value corresponding to said game status in said fourth step.

BRIEF DESCRIPTION OF DRAWINGS

FIG. 9 is a table showing termination conditions etc. of the game.

DETAILED DESCRIPTION OF THE INVENTION

Next, a best mode of a game information processing apparatus and a game control program according to the present invention is described with reference to the attached drawing.

Embodiment

Game Information Processing Apparatus

Figure 1:
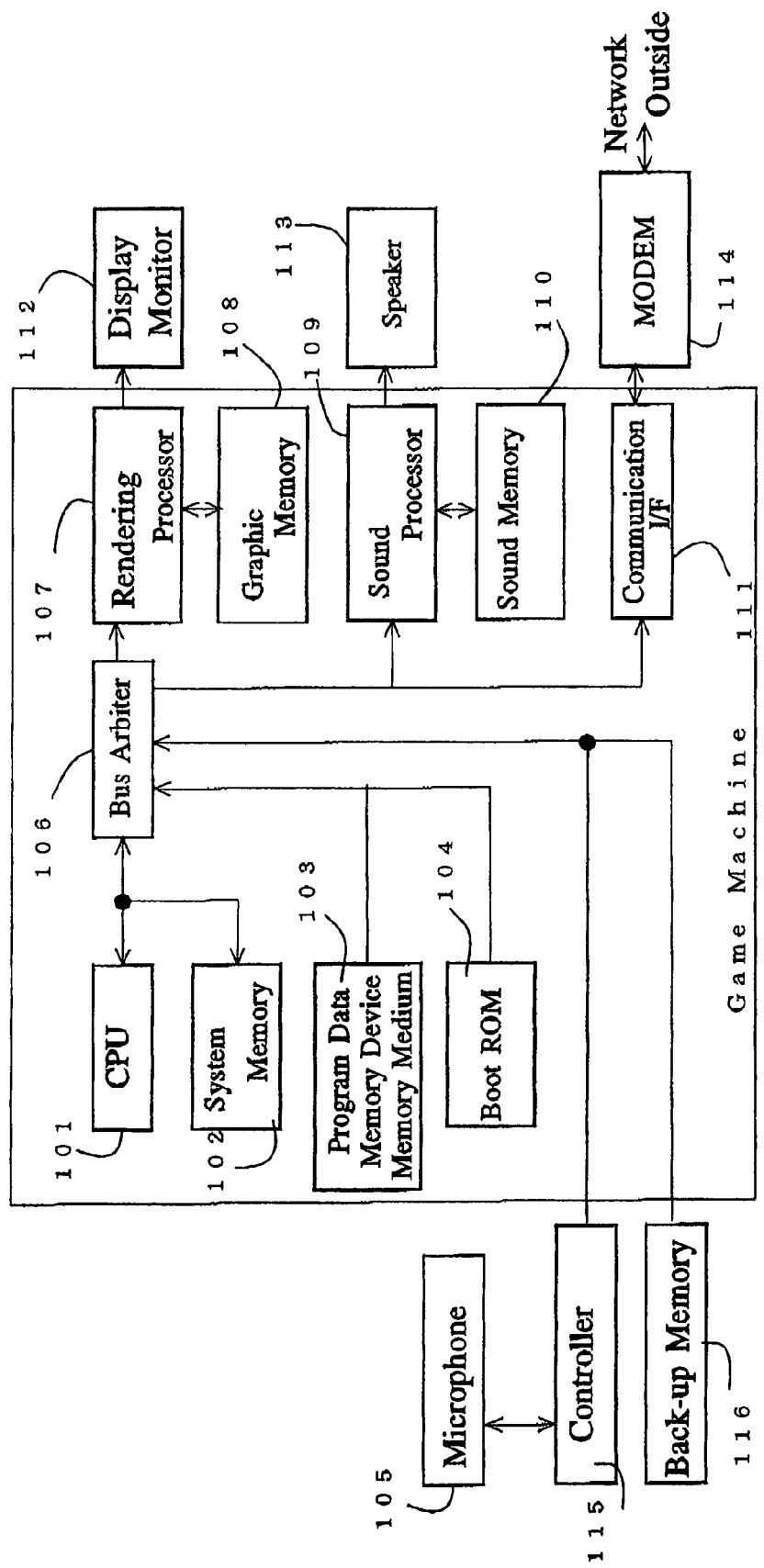
FIG. 1 is a block diagram of the first embodiment of a game information processing apparatus according to the present invention.

FIG. 1 is a block diagram showing an embodiment 1 of a game information processing apparatus.

In FIG. 1, a game information processing apparatus has a CPU 101 for controlling totally the apparatus, a boot ROM 104 for storing a program which starts the apparatus up and a system memory 102 for storing a game control program or other programs and data executed by the CPU 101. The game information processing apparatus is applied to a computer for executing a general information processing program, to a personal computer or game machine for executing a game program or other programs, or to a communication apparatus such as personal handy phone.

The game control program includes a program and data for generating and controlling images other than a program and data for controlling the game, which are loaded from the memory device or memory medium 103 into the system memory 102, or are downloaded through the modem 114 or communication interface 111 from other information processing apparatus.

The game information processing apparatus 100 is connectable through the communication interface 111 or modem 114 to a network IN.

The memory medium may be an optical readable medium such as a CD-ROM and DVD-ROM, an electronically readable medium such as a mask ROM and flash memory.

The game information processing apparatus 100 includes a bus arbiter 106 for controlling a timing of mutual communication between the CPU 101 and other components. The game control program and data are adequately read out from and written into, through the bus arbiter 106, between each of components.

A display monitor 112 is connected to the CPU 100 for displaying images concerning the game control program and other programs. The images displayed on the display monitor 112 are generated by a rendering processor 107.

The rendering processor 107 generates images for example by a processing of projecting objects (polygons) corresponding to three dimensional solid objects on a two dimensional plane (screen) or other processing, in response to instructions from the CPU 101 for executing the game control program. The rendering processor 107 is connected with a graphic memory 108 in which data of images generated by the rendering processor 107 and images already generated are stored.

The game information processing apparatus 100 includes a sound processor 109 for generating a sound, and a sound memory for storing component sound data of a sound generated. The sound processor 109 generates digital signals of sounds according to data stored in the sound memory 110. The sound processor 109 converts the generated sound into analog signals and outputs to the audio amplifier speaker 113 or headphone (not shown).

The game information processing apparatus 100 is connected with a controller 115 for operating the game control program and other programs. A microphone 105 for inputting voice of players etc. is connected to the controller 115. The microphone can be connected not to the controller but directly to the game information processing apparatus 100 if an interface is provided for converting the sound input into digital signals.

Further, a backup memory 116 is connectable to the game information processing apparatus 100 or the controller. A games' result, obtained items, process information of interrupted games, and various information can be stored and carried. The backup memory may be a medium such as an IC memory or hard-disk or may be incorporated within the game information processing apparatus.

Figure 2:
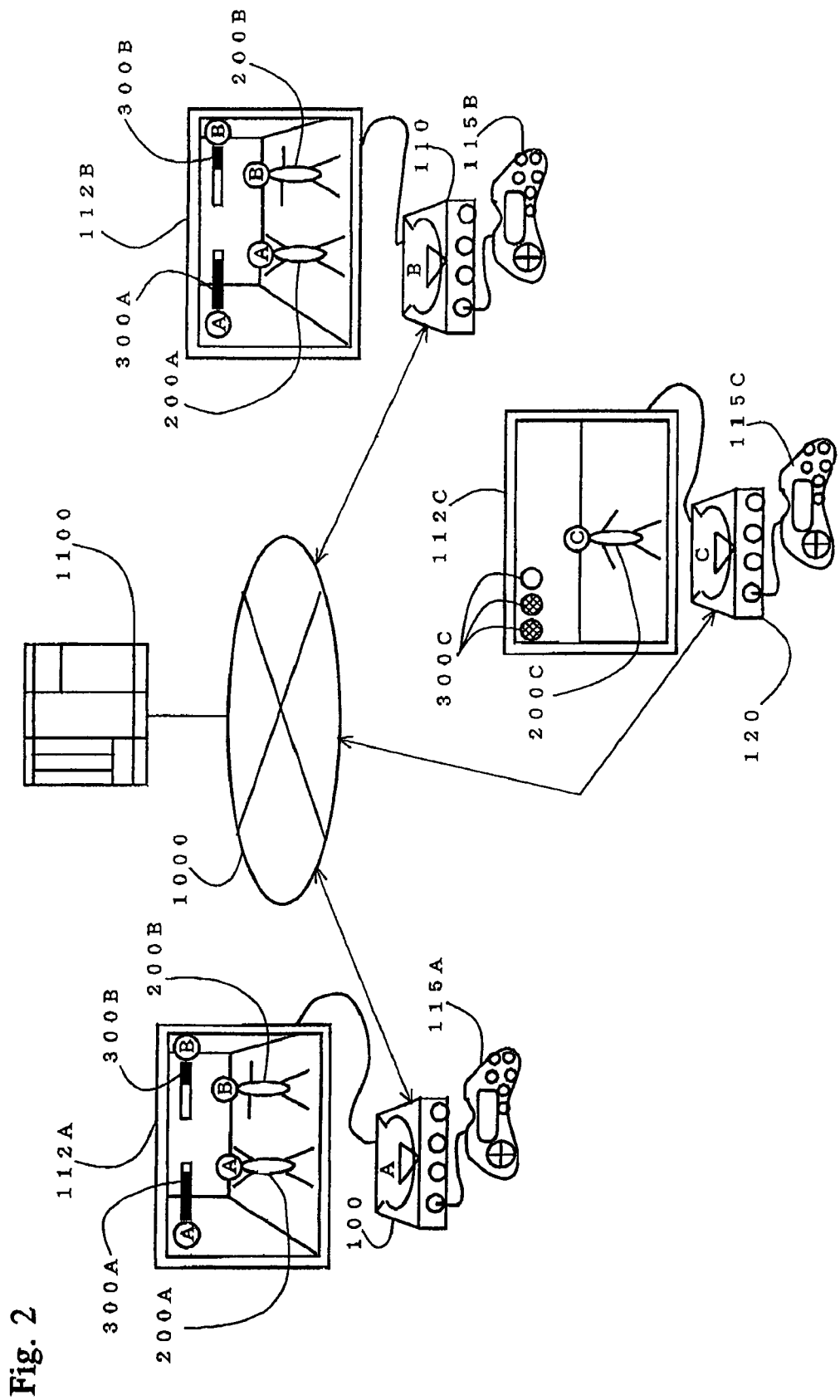
FIG. 2 is a block diagram of a game system including the game information processing apparatus in FIG. 1.

FIG. 2 shows a game information processing system in which the game information processing apparatus 100 and similar game information processing apparatus 110 and 120 are connected through a network 1000. For simple explanation, only three game information processing apparatuses are shown in FIG. 2, however, more players, for example several thousands or several ten thousands players (game machines) may be connected to the network.

The game information processing system includes a server 1100 connected to the network.

The server 1100 controls games, with inputting various information to the game machines 100, 110 and 120 and receiving various information from them.

The players of the game machines 100, 110 and 120 operate the game machines with inputting commands by means of controllers 115 connected to the game machines, the server 1100 controls the game control program and the data of the game control program executed by the game machines 100, 110 and 120.

There are network games, among the above games, which a plurality of players can join. For example, players of the game information processing apparatuses 100 and 110 join the same game, while, the player of the game information processing apparatus 120 executes another game alone.

On the display monitor 112C of the game information processing apparatus 120, a player character (player object) 200C controlled by the player of the game information processing apparatus 120 is shown. On the display monitors 112A and 112C of the game information processing apparatuses 100 and 110, player characters (player object) 200A and 200B controlled by the players of the game information processing apparatuses 100 and 110 are commonly shown.

On the display monitor 112A and 112B, the player characters 200A and 200B and life gages 300A and 300B are displayed, and on the display monitor 112C, the player characters 200C and a life gage 300C are displayed.

The life gages 300A and 300B are displayed meters of bar graph. Remaining energy value of the player characters 200A and 200B is stored in the memory, the energy value is transformed into the image of the meter display in order to indicate how long the player characters 200A and 200B continue the play. When the player character suffers a damage of predetermined extent by an opponent character (opponent object) or an enemy character (enemy object), the energy value decreases and the meter value displayed by the meter decreases. "Playable Number of Times" 300C displays a number of times the character 200C can execute a predetermined game, or a number of times the character 200C can restart the game when fails. It shows finished (failed) two times among total three times and one time remains. The "Playable Number of Times" 300C may be a number of times of "continue" when the game is ended, which is stored in the memory.

Hereafter, a parameter indicating a playable continuity status of a game for meter display, such as energy value, playable number of times etc., is totally called "game continuity ability value". The "game continuity ability value" is decreased as the game is advanced and generally for example due to damage of the player character. The "game continuity ability value" is processed for judging whether the game is to be terminated. The "game continuity ability value" may be increased as the game is advanced and the end of the game may be judged when the "game continuity ability value" reaches a predetermined value. Any value may be applied, which changes as the game advances.

The game information processing apparatus is not limited to the construction in FIG. 1, and but a general purpose computer, portable computer, a mobile phone or any other information processing terminals may be applied to a game processing terminal such as a game machine. When a game system according to the present invention includes a general purpose computer as a game machine, a computer-executable program including program codes, by which the user let the computer execute each step of the program for executing the game, is read into the computer.

The program by which the general purpose computer executes the game is read from a hard-disk device incorporated within the computer, from a memory medium readable by the general purpose computer, or through a network from the server, into the memory of the general purpose computer.

Figure 3:
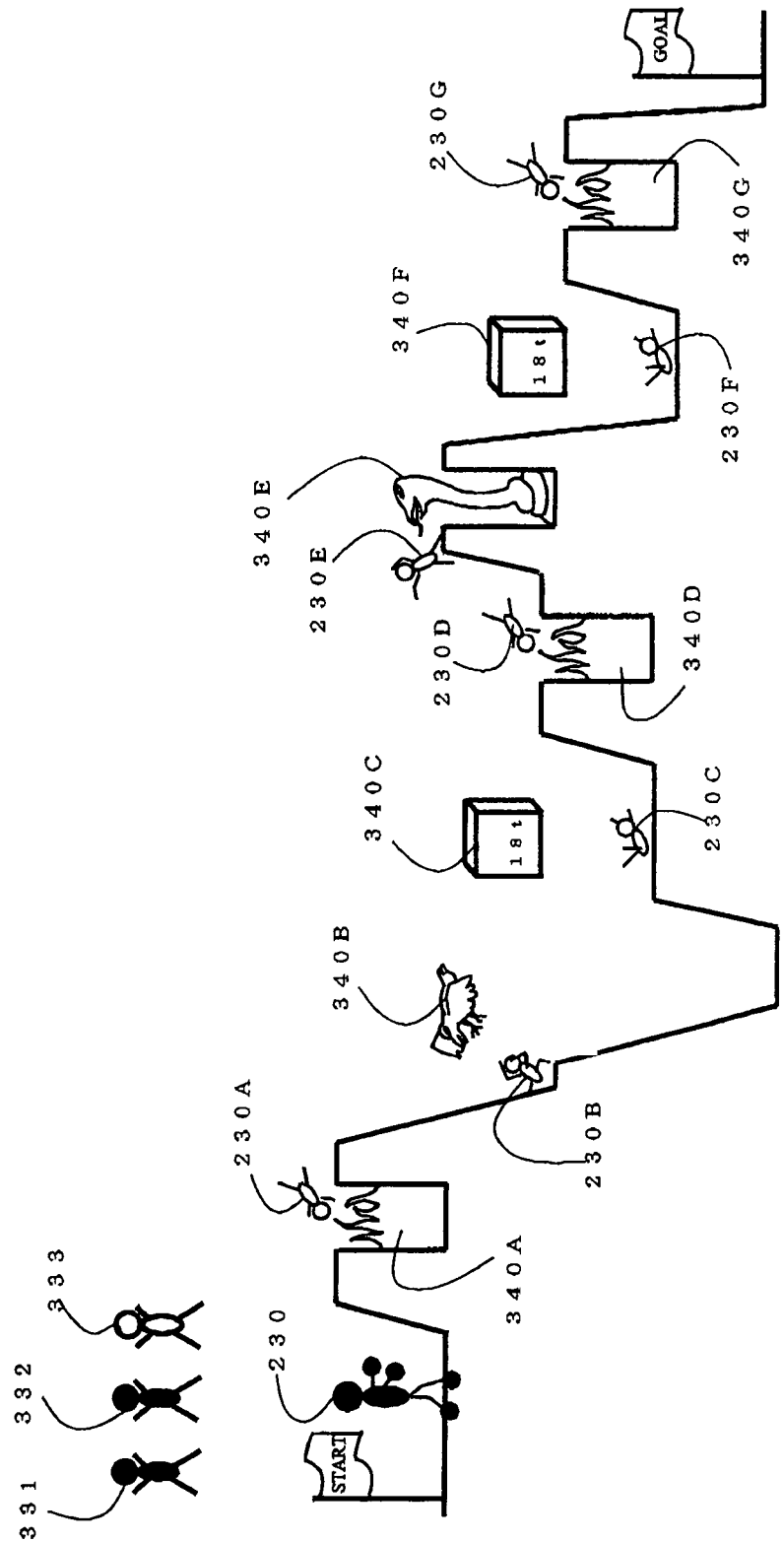
FIG. 3 is a figure showing an exceptional processing of new damage and recurrent damage of the game information processing apparatus in FIG. 1.

FIG. 3 shows a figure showing an example of processing of the "game continuity ability value".

The present invention exempts the "game continuity ability value" from decrement concerning (1) a new failure or damage of a player and (2) repeated failure or damage of the same kinds in the processing or decreasing "game continuity ability value". Hereafter, (1) is called "exceptional processing of new damage" and (2) is called "exceptional processing of recurrent damage".

Exceptional Processing of New Damage

First, (1) "Exceptional Processing of New Damage" is described with reference to FIG. 3.

In an action game or a shooting game, when a character 230 operated by a player passes through areas of event (contrivance) of a devastating flame 340A, monster bird 340B, falling body 340C, devastating flame 340D, big snake 340E, falling body 340F, and devastating flame 340E between a start point to a goal point aiming at the goal, the "game continuity ability value" is decreased by a predetermined decrement value due to unsuccessful operation of the character 230 or due to an attack of the enemy characters etc. Unsuccessful status is shown (by characters 230A, 230B, 230C, 230D, 230E, 230F and 230G) in the conventional game information processing apparatus. However, in the present invention, decrement is exempted when the character is newly damaged. Or, when the first damage occurs by one of a plurality of events of the same kind, the decrement controlled to be exempted.

For example, when the "game continuity ability value" is a number of playable time 300C and the player character suffers from damage between the start point and the goal point, the "game continuity ability value" is decreased by "1". The game is interrupted and started (restarted) from the start point. In this game, when the character 230 fails in jumping over the devastating flame 340A and drops into the devastating flame 340A, or when the character 230 jumps and touches the devastating flame 340A blowing up in order to jump over it to fail in passing the devastating flame 340A, that is, a game status occurs that the character fails in passing the condition of devastating flame 340A and it is the first failure of the event of the devastating flame 340A, the decrement of the "game continuity ability value" is exempted. However, if the character fails in passing the devastating flame 340A at the second time again, the "game continuity ability value" is decreased by a predetermined value.

When the "game continuity ability value" is a life gage 300A and the player character suffers from damage between the start point and the goal point, the life gage 300A is decreased and the game is continued as it is. In this game, when the character 230 succeeds in passing the first devastating flame 340A and drops into the next devastating flame 340D, since the damage of the devastating flame 340D is the first damage, the "game continuity ability value" is exempted from decrement. However, if the character 230 drops again into the devastating flame 340G, since it is not new damage, and the "game continuity ability value" is decreased by a predetermined decrement value.

Also at the event that the character 230 is operated by "dash" operation so that the character 230 passes in high speed and escapes from the falling bodies 340C and 340F, when the character 230 fails at the first time at the falling body 340C due to not so high speed, the decrement of the "game continuity ability value" is exempted. When the character 230 fails in passing at the falling body 340C at the second time, since this is not the first time, the "game continuity ability value" is decreased by a predetermined value. If the character 230 fails in passing at the falling body 340C at the first time due to not so high speed passing, the decrement of the "game continuity, ability value" by the failure is exempted. However, when the character fails in passing at the first time at the next falling body 340F similar to the falling body 340C, the decrement of the "game continuity ability value" is decreased.

Therefore, the players are given a chance to learn unskilled operation and can enjoy the game with fearless operation. There is no impression that the difficulty is not lowered as the total game, so the player will obtain and satisfy the effect and story planned by the game creator. Regardless whether the "game continuity ability value" is the number of times 300C or the life gage 300A, either of the control may be applied that the decrement of a predetermined value is exempted at the first damage at each event or that the decrement of a predetermined value is exempted at the first damage at one of events of the same kind.

As for the monster 340B and the big snake 340E appearing once, "game continuity ability value" may be exempted from decrement as the first damage similar to the devastating flame and the falling flame. Or, as for objects appearing once or only a few times may be excluded from the "exceptional processing of new damage".

When the monster 340B and the big snake 340E are excluded from the "exceptional processing of new damage", the player can enjoy the fear and power when the character meets with them at the only one opportunity.

When the "game continuity ability value" is the life gage 300A, the "game continuity ability value" is not exempted from decrement, but the "game continuity ability value" may be controlled to be limited to a small value, at the new damage. That is, the decrement value of the "game continuity ability value" is smaller than the decrement value of the second or later damage by a value between a positive value and zero.

Exceptional Processing of Recurrent Damage (No. 1)

Next, (2) "Exceptional Processing of Recurrent Damage" is described with reference to FIG. 3 again.

For example, when the character 230 succeeds in passing the devastating flame 340A, drops into the devastating flame 340D and drops again into the devastating flame 340G, since the first failure occurs at the devastating flame 340D, the "game continuity ability value" is decreased by a predetermined value. And the "game continuity ability value" is exempted from decrement at the devastating flame 340G because the drop is a recurrent failure.

When the character touches either of the falling bodies 340C and 340F, the "game continuity ability value" is decreased by a predetermined value. While, when the character touches both of the falling bodies 340C and 340F, the "game continuity ability value" is exempted from decrement at the second time touch at the falling body 340F.

When the same failure or touching to the same obstacles are repeated, the player is not good at the operation generally. The game can be advanced giving a chance for the player to learn the operation as so called "training mode" by exempting the decrement of the "game continuity ability value" at the second time or later damage.

Therefore, the player will be improved in the operation skill and will satisfy the effect and story planned by the game creator.

The decrement value of the "game continuity ability value" may controlled to be smaller at the failure or the touching to obstacles at the second time or later than the decrement value at the failure etc. of the first time. That is, the decrement value of the "game continuity ability value" is smaller than the decrement value of the first failure or touching to obstacles by a value between a positive value and zero.

Exceptional Processing of Recurrent Damage (No. 2)

Figure 4:
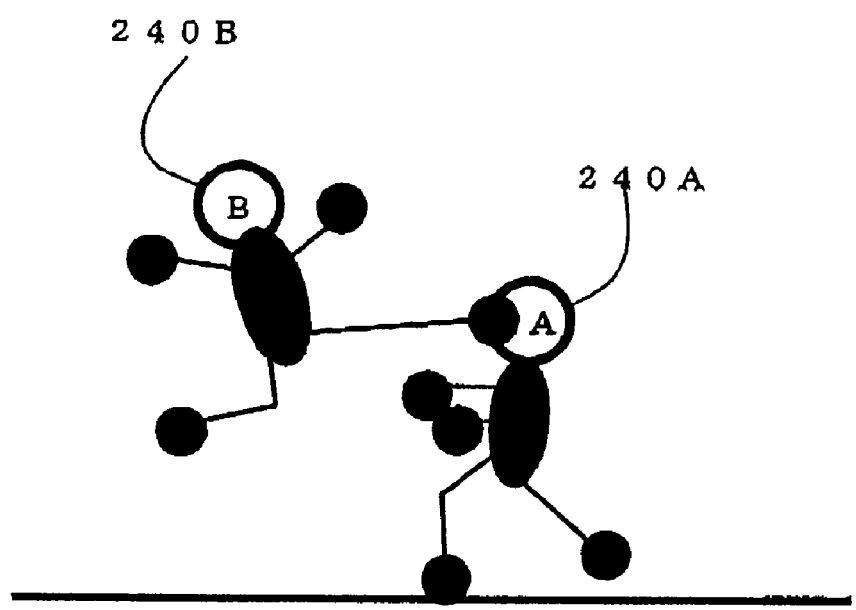
FIG. 4 is a figure showing the exceptional processing of recurrent damage of the game information processing apparatus in FIG. 1.
Figure 5:
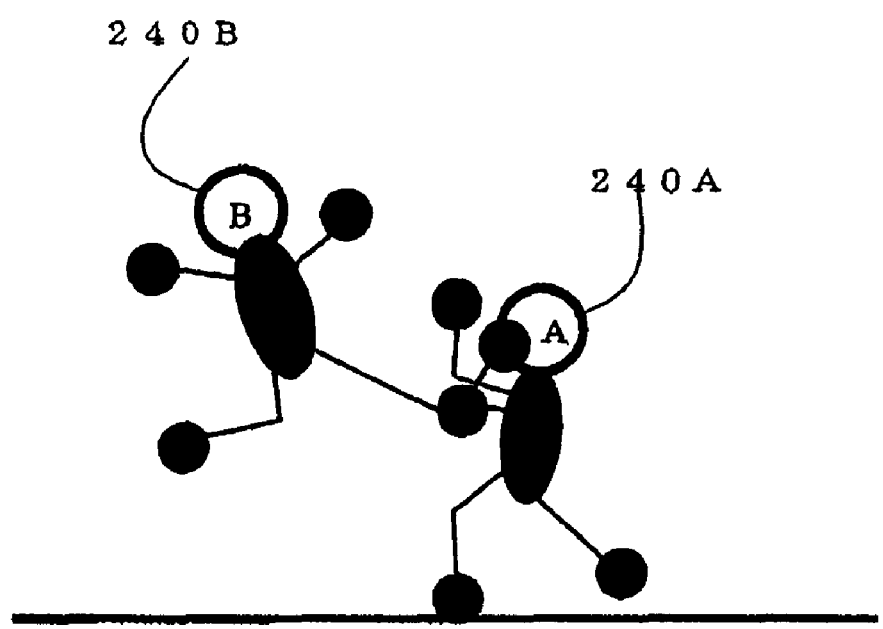
FIG. 5 is a figure showing the exceptional processing of recurrent damage in FIG. 4.

FIG. 4 and FIG. 5 show another example of the "Exceptional Processing of Recurrent Damage" in the fighting or action game.

In FIG. 4, a character 240A suffers from a damage by a jumping kick of a character 240B. In FIG. 5, the character 240A defends against the jumping kick and the damage is prevented. The character 240B that is sending a technique to the character 240A may be either of a character controlled by the player's operational input (indicative input) or a non-player character controlled when the CPU 101 executes the game program.

During the exceptional processing of recurrent damage in the fighting game, when the character 240A is attacked with a technique by the character 240B and the character 240A does not defend properly, the decrement of the "game continuity ability value" is exempted so that the damage is exempted even when the character 240A is to be damaged. On the other hand, when the character 240A defends by a proper operation and cannot defend the same technique twice or more, the "game continuity ability value" is decreased by a predetermined value.

Instead of the exemption of the decrement of the "game continuity ability value", the decrement value of the "game continuity ability value" may be smaller when the defense is not successful at all.

It is also possible that when a operational input for a quick movement of the player character in order to escape the opponent's attack takes place, the "game continuity ability value" is changed by as many times as that defense took place.

Therefore, the player will be improved in the operation skill and will satisfy the effect and story planned by the game creator. The player can escape from "HAME", the situation that the player does not know the way to escape from an attack due to low skill and is concentratedly attacked. So, beginner players will not lose interest in the game.

Figure 6:
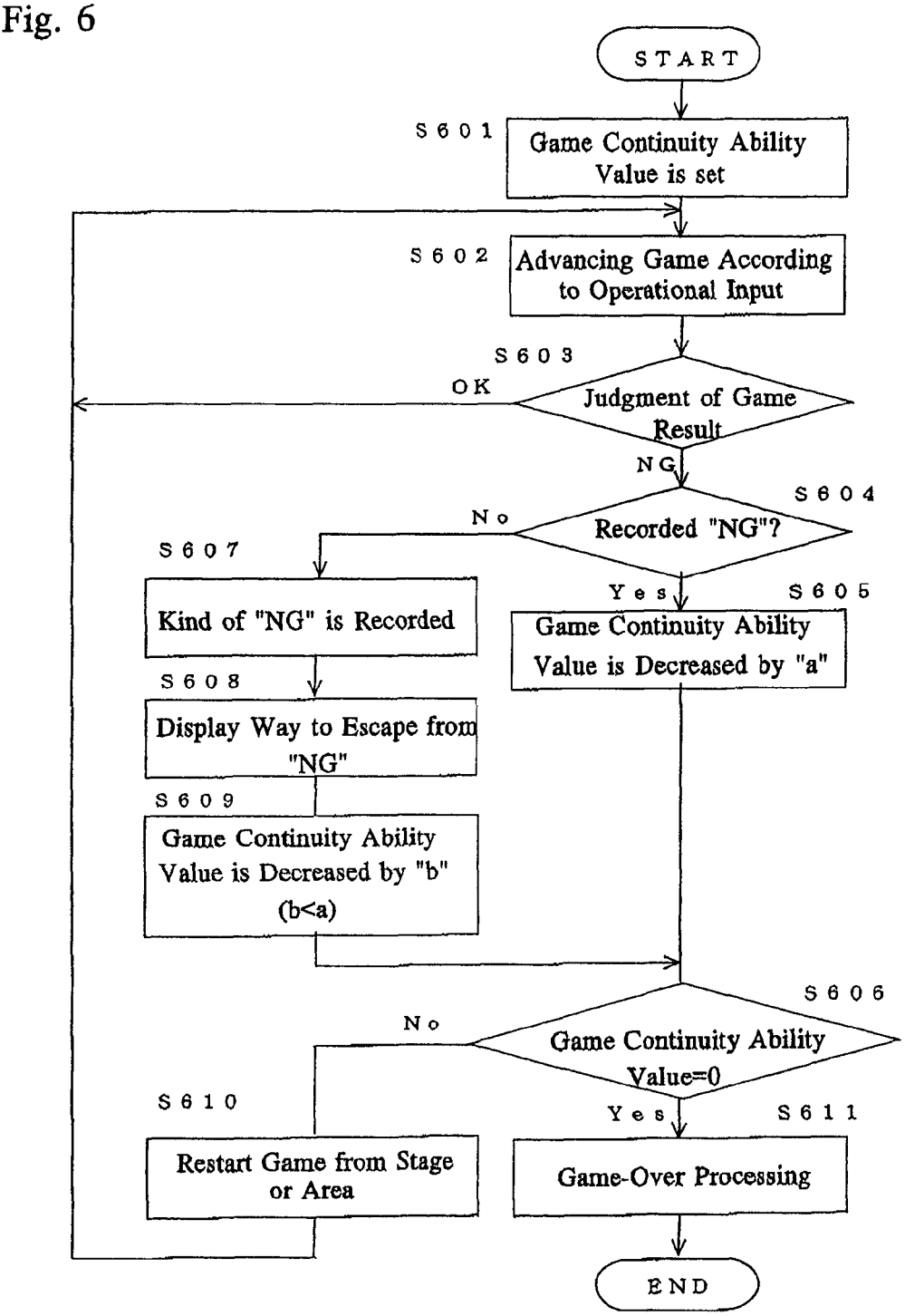
FIG. 6 is a flowchart showing the exceptional processing of new damage of the game information processing apparatus in FIG. 1.

[Termination Processing and Game Control Program]
Exceptional Processing of New Damage FIG. 6 is a flowchart showing a termination processing and a game control program for the game information processing apparatus, according to the exceptional processing of new damage.

In FIG. 6, the processing according to the exceptional processing of new damage is executed by the following steps. An area for storing "NG" status (game status) such as damage due to unsuccessful operation is secured in the system memory 102. The "NG" situation includes positional information of the big snake 340F, other enemy characters, falling body 340C and other obstacle objects, positional information of the player character when collision is judged with these characters or objects, flag information indicating whether the character successfully passes or not at event positions predetermined in a list of information.

Step S601: For starting the game, the "game continuity ability value" is stored in the system memory 102 first, and the game is started.

Step S602: After the game is started, the game is advanced according to the indicative operation of the player.

Step S603: A game result is judged. It is judged whether the "NG" status occurs due to unsuccessful operation or due to attack at the events of the enemy characters. If the "NG" status does not occur, the processing is returned to the step S602, otherwise, advanced to the step S604.

Step S604: It is judged whether the "NG" status is a status already stored in the system memory 102, for example, an information showing the same "NG" status is recorded or a flag corresponding the status is ON. This is a judgment of new "NG" (new status) or not. If the "NG" status is not new, the processing is advanced to the step S607, if new, to the step S607. The judgment of the step S604 is executed by the CPU 101. The CPU 101 functions as a judgment means of new status.

Step S605: The "game continuity ability value" is decreased by a decrement value "a" corresponding to a damage the player character suffers.

Step S606: It is judged whether the "game continuity ability value" becomes zero (termination value) or not. If "game continuity ability value"=0 (termination value), the processing is advanced to the step S611 of game end processing. If "game continuity ability value" does not reach zero (termination value), the processing is advanced to the step S610 for continuing the game. The termination judgment is executed by the CPU 101. The CPU 101 functions as a judgment means of termination.

Step S607: The "NG" status is stored for the judgment of the same "NG" status at the second time or later. Then, the processing is advanced to the step S608. The "NG" status is stored in the system memory 102. The system memory 102 functions as a memory means.

Step S608: A way to escape the "NG" is output as an image or sound so that the player can escape from the damage. Then the step is advanced to the step S609.

Step S609: The "game continuity ability value" is exempted from decrement, or decreased by a smaller value than a predetermined vale. The control of the "game continuity ability value" is executed by the CPU 101 ("game continuity ability value" control means).

Therefore, the player is given a chance to learn unskilled operation and can enjoy the game with fearless operation. There is no impression that the difficulty is not lowered as the total game, so the player will obtain and satisfy the effect and story planned by the game creator.

Step S610: The game is restarted from the stage or area where the "NG" status occurs. Then, the processing is returned to the step S602. It is also possible that the game may be restarted from the first start point.

Step S611: When the "game continuity ability value" becomes zero (termination value), the game is terminated.

Exceptional Processing of Recurrent Damage (NO. 1)

Figure 7:
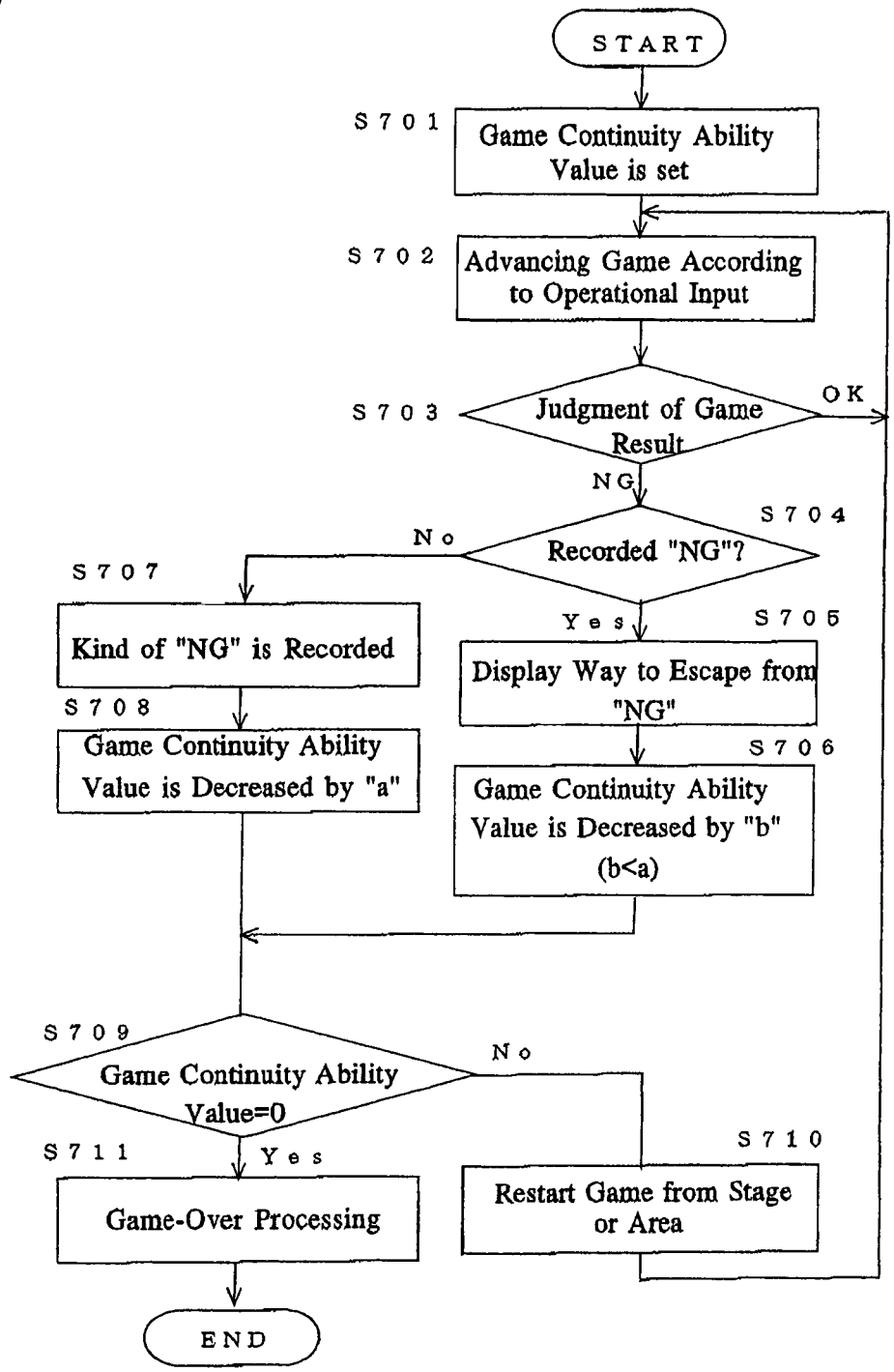
FIG. 7 is a flowchart showing the exceptional processing of recurrent damage of the game information processing apparatus in FIG. 1.

FIG. 7 is flowchart showing termination processing and game control program of the game information processing apparatus according to the exceptional processing of recurrent damage.

In FIG. 7, the processing according to the exceptional processing of recurrent damage is executed by the following steps. Also, in the exceptional processing of recurrent damage, an area for storing "NG" status (game status) such as damage due to unsuccessful operation is secured in the system memory 102. The "NG" situation includes positional information of the big snake 340F, other enemy characters, falling body 340C and other obstacle objects, positional information of the player character when collision is judged with these characters or objects, flag information indicating whether the character successfully passes or not at event positions predetermined in a list information.

Step S701: For starting the game, the "game continuity ability value" is stored in the system memory 102 first, and the game is started.

Step S702: After the game is started, the game is advanced according to the indicative operation of the player.

Step S703: A game result is judged. It is judged whether the "NG" status occurs due to unsuccessful operation or due to attack at the events of the enemy characters. If the "NG" status does not occur, the processing is returned to the step S702, otherwise, advanced to the step S704.

Step S704: It is judged whether the "NG" status is a status already stored in the system memory 102, for example, an information showing the same "NG" status is recorded or a flag corresponding the status is ON. This is a judgment of recurrent "NG" (recurrent status) or not. If the "NG" status is not recurrent, the processing is advanced to the step S705, and if recurrent, to the step S707. The judgment of the step S704 is executed by the CPU 101. The CPU 101 functions as a judgment means of recurrent status.

Step S705: A way to escape the "NG" is output by an image or sound generated so that the player can escape from the damage. Then the step is advanced to the step S706.

Step S706: The "game continuity ability value" is exempted from decrement, or decreased by a smaller value "b" than a predetermined value "a" in the step S708. The control of the "game continuity ability value" is executed by the CPU 101. The CPU 101 functions as a "game continuity ability value" control means.

Therefore, the player will be improved in the operation skill and will obtain and satisfy the effect and story planned by the game creator.

Step S707: The "NG" status is stored for the judgment of the same "NG" status at the second time or later. Then, the processing is advanced to the step S708. The "NG" status is stored in the system memory 102. The system memory 102 functions as a memory means.

Step S708: The "game continuity ability value" is decreased by a predetermined decrement value "a" corresponding to the damage, then the processing is advanced to the step S709. The control of the "game continuity ability value" is executed by the CPU 101 ("game continuity ability value" control means).

Step S709: It is judged whether the "game continuity ability value" becomes zero (termination value) or not. If "game continuity ability value"=0 (termination value), the processing is advanced to the step S711 of game end processing. If "game continuity ability value" does not reach zero (termination value), the processing is advanced to the step S710 for continuing the game. The termination judgment is executed by the CPU 101. The CPU 101 functions as a judgment means of termination.

Step S710: The game is restarted from the stage or area where the "NG" status occurs. Then, the processing is returned to the step S702. It is also possible that the game is restarted from the first start point.

Step S711: When the "game continuity ability value" becomes zero (termination value), the game is terminated.

(3) Exceptional Processing of Recurrent Damage (NO. 2)

Figure 8:
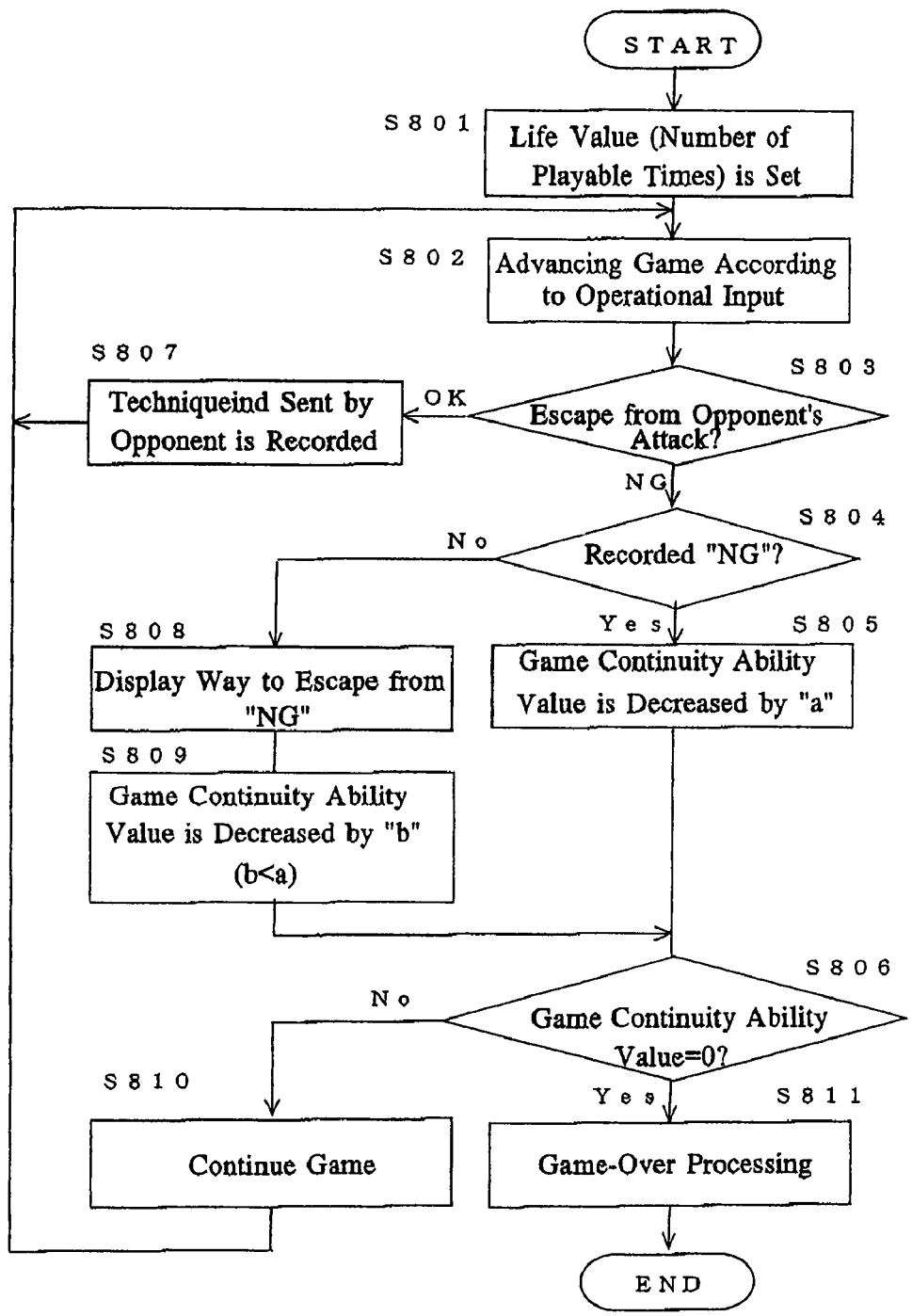
FIG. 8 is a flowchart showing another exceptional processing of recurrent damage of the game information processing apparatus in FIG. 1.

FIG. 8 is flowchart showing termination processing and game control program of the game information processing apparatus according to the exceptional processing of recurrent damage.

In FIG. 8, the processing according to the exceptional processing of recurrent damage is executed by the following steps. An area for storing kinds of preventing technique among techniques of the enemy characters, and flag information indicating whether a technique is a preventing technique or not is provided in a list of information of techniques of enemy characters.

Step S701: For starting the game, the "game continuity ability value" is stored in the system memory 102 first, and the game is started.

Step S802: After the game is started, the game is advanced according to the indicative operation of the player.

Step S803: It is judged whether the character defends when the character is attacked with a technique by the enemy character. If the character defends, the processing is advanced to the step S807, otherwise, to the step S805. In the judgment, collision of the technique of the enemy characters with the player character is determined. If collision occurs, it is judged whether the player character defends against the technique.

If the player character unexpectedly operates a defense when the defense is unnecessary because the enemy character is remote from the player character when the enemy character sends a technique, it is judged that the defense took place. Then, the player character will be damaged again and again by the same technique because the player dos not know the defense manner. It may be judged that the player character prevents the attack of the enemy character when the player moves the player character quickly so as to escape from the attack by an operational input and the player character is at a position where the collision occurs as a result of the technique of the enemy character.

Step S804: It is judged whether the technique of the enemy character is already stored in the system memory 102. This is a judgment of recurrent unsuccessful defense or not. If it is the recurrent unsuccessful defense, the processing is advanced to the step S805. If defense was successful in a previous defense, the processing is advanced to the step S808. The judgment of the step S804 is executed by the CPU 101. The CPU 101 functions as a judgment means of recurrent status.

Step S805: The "game continuity ability value" is decreased by a predetermined value "a". Then, the processing is advanced to the step S806. The control of the "game continuity ability value" is executed by the CPU 101. The CPU 101 functions as a "game continuity ability value" control means.

Step S806: It is judged whether the "game continuity ability value" becomes zero (termination value) or not. If "game continuity ability value"=0 (termination value), the processing is advanced to the step S811 of game end processing. If "game continuity ability value" does not reach zero (termination value), the processing is advanced to the step S810 for continuing the game. The termination judgment is executed by the CPU 101. The CPU 101 functions as a judgment means of termination.

Step S807: Information of contents of attack of the enemy characters and flag information indicating whether the technique enemy characters can send is successfully defended or not are recorded, preparing for the following attacks. Then, the processing is returned to the step S802. This information is stored in the system memory 102. The system memory 102 functions as a memory means.

Step 808: When the player is attacked by the same technique again, an image or a sound is generated and output, showing a way to escape said attack. Then, the processing is advanced to the step S809.

Step S809: The "game continuity ability value" is exempted from decrement, or decreased by a smaller value "b" than a predetermined value "a". The control of the "game continuity ability value" in the step S809 is executed by the CPU 101 ("game continuity ability value" control means).

Therefore, the player will be improved in the operation skill as well as will be able to obtain and satisfy the effect and story planned by the game creator. The player can escape from "HAME", the situation that the player does not know the way to escape from an attack due to low skill and is concentratedly attacked. So, beginner players will not lose interest in the game.

Step S810: The processing is returned to the step S802 so that the game is restarted from the status that, (i.e., when) the character suffers the technique.

Step S811: When the "game continuity ability value" becomes zero (termination value) in the step S806, the game is terminated.

The above description relates to an action game, shooting game and fighting game. In the adventure game or role-playing game, the processing in FIG. 6 and FIG. 7 are applied to incorrect selection or behavior as "NG" game statuses.

In FIG. 9, games are totally classified into "shooting/action game", "fighting game", "adventure game" and "role-playing game". Specifications of the games, a judgment manner of game result, a judgment manner of the game being ended, and a condition of the game being easily ended are provided. The present invention controls the judgment of the end of the game so that the player is given a chance to learn unskilled operation and can enjoy the game with fearless operation. There is no impression that the difficulty is not lowered as the total game, so the player will satisfy the effect and story planned by the game creator.

As for the judgment of the game result, the judgment that the "game continuity ability value" is to be decreased or not may be notified by displaying an image on the game image the player is playing or by outputting a sound.

By the processing discussed above, situations of attacks due to erroneous operation of a game play are transmitted to the player who is playing the game judged as above. It is possible to draw player's attention not to get into the same situation.

A similar notification will be effective to prevent misunderstanding of opponents that there is a contradiction in a game.

Therefore, the present invention is applicable to various games in which a judgment is necessary concerning game-ending, interruption and restart.

ADVANTAGES

According to the present invention, players enjoy original game interests planned by game creators regardless of players' skill, and are encouraged to improve game skill, without decreasing difficulties of the game, for example by omitting the game effect.

What is claimed is:

1. A game information processing apparatus which advances a game in response to player's indicative input, changes a predetermined game continuity ability value in response to an occurrence of a game status under a predetermined condition according to a progress of said game, and judges whether said game is to be continued or not according to said game continuity ability value, comprising:
   a memory to store said occurrence of said game status;
   a new status judgment device configured for judging whether said occurrence of said game status has been already stored in said memory or not;
   a game continuity ability value control for changing said game continuity ability value by a decrement value corresponding to said game status when said new status judgment device judges that said game status is new, for storing said game status in said memory when said new status judgment device judges that said game status is not stored, and for continuing said game without changing said game continuity ability value and for changing said game continuity ability value by a value less than said decrement value; and
   a termination judgment device configured for terminating said game when said game continuity ability value reaches a predetermined termination value and for continuing said game when said game continuity ability value does not reach said predetermined termination value.

2. A game information processing apparatus which advances a game in response to player's indicative input, changes a predetermined game continuity ability value in response to an occurrence of a game status under a predetermined condition according to a progress of said game, and judges whether said game is to be continued or not according to said game continuity ability value, comprising:
   a memory to store said occurrence of said game status;
   a status recurrence judgment device configured for judging whether said occurrence of said game status has been already stored in said memory or not;
   a game continuity ability value control configured for storing said game status in said memory when said new status judgment device judges that said game status is not stored as well as for changing said game continuity ability value by a decrement value corresponding to said game status, and for continuing said game without changing said game continuity ability value and for changing said game continuity ability value by a value less than said decrement value; and
   a termination judgment device configured for terminating said game when said game continuity ability value reaches a predetermined termination value and for continuing said game when said game continuity ability value does not reach said predetermined termination value.

3. A game information processing apparatus which operates a player object according to a player's indicative input so as to attack an opponent object, which controls a game continuity ability value that is predetermined and corresponds to said opponent object so that said game continuity value is changed in response to a content of said attack and in response to a status of said opponent object according to a progress of said game, and which judges whether said game is to be continued or not according to said game continuity ability value, comprising:
   a memory to store a content of an attack when a player object is offense side and an opponent object is defense side;
   a judgment device configured for judging whether said content of said attack has been already stored in said memory or not when said opponent object is not defense side while said player object is offense side;
   a game continuity ability value control configured for changing said game continuity ability value by at least a decrement value corresponding to said content of said attack when said judgment device judges that said content is stored, and for continuing said game without changing said game continuity ability value or for changing said game continuity ability value by a value less than said decrement value; and
   a termination judgment device configured for terminating said game when said game continuity ability value reaches a predetermined termination value and for continuing said game when said game continuity ability value does not reach said predetermined termination value.

4. A game program stored on a computer readable, non-transitory medium and when executed by the computer, having a function that said game program advances a game in response to player's indicative input, that said game program changes a predetermined game continuity ability value in response to an occurrence of a game status under a predetermined condition according to a progress of said game, and that said game program judges whether said game is to be continued or not according to said game continuity ability value, comprising:

securing an area in a memory for storing an occurrence of a game status;

judging whether said status occurred under said predetermined condition is stored in said memory or not;

changing said game continuity ability value by a decrement value when it is judged that said status is stored in said judging;

storing said game status in said memory when it is judged that said game status is not stored in said second, and for continuing said game without changing said game continuity ability value or for changing said game continuity ability value by a value less than said decrement value; and terminating said game when said game continuity ability value reaches a predetermined termination value and for continuing said game when said game continuity ability value does not reach said predetermined termination value.

5. A game program according to claim 4, further comprising generating and outputting an image or a sound showing a way to escape said game status when said game status is not stored in said memory.

6. A game program according to claim 4, further comprising generating and outputting an image or a sound showing a way to escape said attack when said content of attack is not stored in said memory.

7. A game program according to claim 4, further comprising generating and outputting an image or a sound showing a way to escape said contact condition when said contact condition is not stored in said memory.

8. A game program stored on a computer readable, non-transitory medium and when executed by the computer, having a function that said game program advances a game in response to player's indicative input, that said game program changes a predetermined game continuity ability value in response to an occurrence of a game status under a predetermined condition according to a progress of said game, and that said game program judges whether said game is to be continued or not according to said game continuity ability value, comprising:

securing an area in a memory for storing an occurrence of said game status;

judging whether said status occurred under said predetermined condition is stored in said memory or not;

storing said game status in said memory when it is judged that said status is not stored in said judging and for changing said game continuity ability value by a decrement value corresponding to said game status;

continuing said game without changing said game continuity ability value and for changing said game continuity ability value by a value less than said decrement value; and terminating said game when said game continuity ability value reaches a predetermined termination value and for continuing said game when said game continuity ability value does not reach said predetermined termination value.

9. A game program according to claim 8, further comprising notifying said player by outputting an image or a sound when said game continuity ability value is not changed or is changed by a value less than said decrement value corresponding to said game status in said continuing said game.

10. A game program according to claim 8, further comprising generating and outputting an image or a sound showing a way to escape said game status when said game status is stored in said memory.

11. A game program stored on a computer readable, non-transitory medium and when executed by the computer, having a function that a player object is operated by a player's indicative input so as to attack an opponent object, and that a game continuity ability value predetermined corresponding to said opponent object is changed in response to a content of said attack and in response to a status of said opponent object according to a progress of said game, and that it is judged whether said game is to be continued or not according to said game continuity ability value, comprising:

storing said content of said attack in a memory when said player object is offense side and said opponent object is defense side;

judging whether said content of said attack has been already stored in said memory or not when said object of said opponent is not defense side while said object of said player is offense side;

changing said game continuity ability value by at least a decrement value corresponding to said content of attack when it is judged that said content is stored in said judging;

continuing said game without changing said game continuity ability value or for changing said game continuity ability value by a value less than said decrement value when it is judged that said content is stored in said judging; and terminating said game when said game continuity ability value reaches a predetermined termination value.

12. A game program stored on a computer readable, non-transitory medium and when executed by the computer, having a function that a player object is operated by a player's indicative input or by CPU's control so as to attack an opponent object, and that a game continuity ability value predetermined corresponding to said opponent object is changed in response to a content of said attack and in response to a status of said opponent object according to a progress of said game, and that it is judged whether said game is to be continued or not according to said game continuity ability value, comprising:

storing said content of said attack in a memory when said player object is offense side and said opponent object is defense side;

judging whether said content of said attack has been already stored in said memory or not when said object of said opponent is not defense side while said object of said player is offense side;

changing said game continuity ability value by at least a decrement value corresponding to said content of attack when it is judged that said content is stored in said judging;

continuing said game without changing said game continuity ability value or for changing said game continuity ability value by a value less than said decrement value when it is judged that said content is stored in said judging; and terminating said game when said game continuity ability value reaches a predetermined termination value and for continuing said game when said game continuity ability value does not reach said predetermined termination value.

13. A game program stored on a computer readable, non-transitory medium and when executed by the computer, having a function that a player object is operated and moved on a map by a player's indicative input, that a contact condition of said player object with an obstacle object set on said map, that a predetermined game continuity ability value is changed according to said judgment of said contact condition, and that it is judged whether said game is to be continued or not according to said game continuity ability value, comprising:

securing an area in a memory for storing said judgment of said contact condition;

judging whether said judgment of said contact condition is stored in said memory or not when said contact condition is judged;

changing said game continuity ability value by a predetermined decrement value corresponding to said judgment when said contact condition is stored in said memory in said judging;

storing said judgment when it is judged that said contact condition is not stored in said memory in said judging, and for continuing said game without changing said game continuity ability value or for changing said game continuity ability value by a value less than said decrement value; and terminating said game when said game continuity ability value reaches a predetermined termination value and for continuing said game when said game continuity ability value does not reach said predetermined termination value.

* * * * *